(12) United States Patent
Danilov et al.

(10) Patent No.: US 11,847,141 B2
(45) Date of Patent: Dec. 19, 2023

(54) MAPPED REDUNDANT ARRAY OF INDEPENDENT NODES EMPLOYING MAPPED RELIABILITY GROUPS FOR DATA STORAGE

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 372 days.

(21) Appl. No.: 17/152,537

(22) Filed: Jan. 19, 2021

(65) Prior Publication Data
US 2022/0229851 A1  Jul. 21, 2022

(51) Int. Cl.
*G06F 16/28* (2019.01)
*G06F 21/62* (2013.01)
*G06F 16/21* (2019.01)

(52) U.S. Cl.
CPC .......... *G06F 16/285* (2019.01); *G06F 16/211* (2019.01); *G06F 21/6218* (2013.01)

(58) Field of Classification Search
CPC ... G06F 16/285; G06F 16/211; G06F 21/6218
See application file for complete search history.

(56) References Cited

U.S. PATENT DOCUMENTS

| | | | |
|---|---|---|---|
| 4,675,869 A | 6/1987 | Driessen | |
| 5,675,802 A | 10/1997 | Allen et al. | |
| 5,805,788 A | 9/1998 | Johnson | |
| 5,950,225 A | 9/1999 | Kleiman | |
| 6,065,020 A | 5/2000 | Dussud | |
| 6,073,218 A | 6/2000 | Dekoning et al. | |
| 6,108,684 A | 8/2000 | Dekoning et al. | |
| 6,233,696 B1 | 5/2001 | Kedem | |
| 6,240,527 B1 | 5/2001 | Schneider et al. | |
| 6,502,243 B1 | 12/2002 | Thomas | |

(Continued)

OTHER PUBLICATIONS

Notice of Allowance received for U.S. Appl. No. 16/745,855 dated Sep. 10, 2021, 37 pages.

(Continued)

*Primary Examiner* — Truong V Vo
(74) *Attorney, Agent, or Firm* — Amin, Turocy & Watson, LLP

(57) ABSTRACT

Storage of data according to mapped reliability groups (MRGs) of mapped redundant arrays of independent nodes (mapped clusters) is disclosed. Real reliability groups (RRGs) of a real cluster can provide compartmentalization that can reduce a probability of a data loss event occurring in a cluster storage system. MRGs for a mapped cluster employing the RRGs of the real cluster can provide additional compartmentalization that can further reduce a probability of a data loss event occurring. A data protection set can be stored according to a first group of MRGs and a redundant representation of the data protection set can be stored according to a second group of MRGs, wherein a network distance between the first and second group of MRGs is greater than a network distance between constituent MRGs of either the first or second group of MRGs.

20 Claims, 10 Drawing Sheets

(56) References Cited

U.S. PATENT DOCUMENTS

| | | |
|---|---|---|
| 6,549,921 B1 | 4/2003 | Ofek |
| 7,007,044 B1 | 2/2006 | Rafert et al. |
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 | 12/2009 | Karr et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,653,792 B2 | 6/2010 | Shimada et al. |
| 7,752,403 B1 | 7/2010 | Weinman, Jr. |
| 7,895,394 B2 | 2/2011 | Nakajima et al. |
| 8,037,391 B1 | 10/2011 | Jung et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 | 4/2013 | Goel |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 | 5/2014 | Goel |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 | 10/2018 | Puhov et al. |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,924,543 B1 | 2/2021 | Chen et al. |
| 10,951,236 B2 | 3/2021 | Chen et al. |
| 11,023,331 B2 | 6/2021 | Danilov et al. |
| 11,150,995 B1 | 10/2021 | Dhoolam et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 | 2/2005 | Burkey |
| 2005/0050131 A1 | 3/2005 | Lawrow |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0228828 A1 | 9/2008 | Teodorescu |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 | 3/2011 | Walls et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 | 8/2011 | Mizuno et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |

(56) References Cited

U.S. PATENT DOCUMENTS

| | | |
|---|---|---|
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0006850 A1 | 1/2014 | Aliev et al. |
| 2014/0040417 A1 | 2/2014 | Galdwin et al. |
| 2014/0064048 A1 | 3/2014 | Cohen et al. |
| 2014/0082414 A1 | 3/2014 | Olster |
| 2014/0115182 A1 | 4/2014 | Sabaa et al. |
| 2014/0122745 A1 | 5/2014 | Singh et al. |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380093 A1 | 12/2014 | Molaro et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0032279 A1 | 2/2018 | Davis et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Dydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0266062 A1 | 8/2019 | Borlick et al. |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0081778 A1 | 3/2020 | Varanasi |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2020/0218450 A1 | 7/2020 | Danilov et al. |
| 2020/0241759 A1* | 7/2020 | Danilov ............... G06F 3/0605 |
| 2020/0382141 A1 | 12/2020 | Wang et al. |

(56) References Cited

U.S. PATENT DOCUMENTS

| | | |
|---|---|---|
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Non-Final Office Action received for U.S. Appl. No. 16/526,182 dated Nov. 24, 2021, 83 pages.
Notice of Allowance received for U.S. Appl. Serial No. 16/888,144 dated Nov. 22, 2021, 71 pages.
Non-Final Office Action received for U.S. Appl. No. 16/698,096 dated Jan. 5, 2022, 21 pages.
Non-Final Office Action received for U.S. Appl. No. 16/670,715 dated Jan. 5, 2022, 22 pages.
Non-Final Office Action received for U.S. Appl. No. 16/403,417 dated Dec. 6, 2022, 39 pages.
Notice of Allowance received for U.S. Appl. No. 16/986,222 dated Oct. 13, 2022, 37 pages.
Non-Final Office Action received for U.S. Appl. No. 17/153,602 dated Oct. 25, 2022, 40 pages.
Final Office Action received for U.S. Appl. No. 16/803,913 dated Oct. 26, 2022, 102 pages.
Files Controlling User Accounts and Groups. https://access.redhat.com/documentation/en-us/red_hat_enterprise_linux/4, 2012, pp. 1-2. (Year: 2012).
Office Action dated Apr. 13, 2021 for U.S. Appl. No. 16/781,316, 21 pages.
Office Action dated Nov. 24, 2021 for U.S. Appl. No. 16/538,984, 30 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
Dell, "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf, H14071.1, Jun. 2015, pp. 1-21.
Mohan et al., "Geo-aware erasure coding for high-performance erasure-coded storage clusters", Annals of Telecommunications, vol. 73, Springer, Jan. 18, 2018, pp. 139-152.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Jarvis, Zhu, "ECS Overview and Architecture", Dell Technologies, h14071.18, Feb. 2021, pp. 1-55.
EMC; "EMC ECS (Elastic Cloud Storage) Architectural Guide v2.x", URL : https://www.dell.com/community/s/vjauj58549/attachments/vjauj58549/solutions-ch/477 /1/h14071-ecs-architectural-guide-wp.pdf,Jun. 2015, 21 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Notice of Allowance received for U.S. Appl. No. 16/570,657 dated Sep. 7, 2021, 65 pages.

(56) References Cited

OTHER PUBLICATIONS

Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Notice of Allowance received for U.S. Appl. No. 16/584,800 dated Jun. 27, 2022, 33 pages.
Notice of Allowance received for U.S. Appl. No. 16/179,486 dated Jun. 8, 2022, 67 pages.
Final Office Action received for U.S. Appl. No. 16/986,222 dated Jun. 17, 2022, 76 pages.
Final Office Action received for U.S. Appl. No. 17/153,602 dated Jul. 14, 2022, 34 pages.
Final Office Action received for U.S. Appl. No. 16/538,984 dated Jun. 1, 2022, 114 pages.
Notice of Allowance received for U.S. Appl. No. 17/333,815 dated Jun. 27, 2022, 27 pages.
Wu et al., "Improving I/O Performance of Clustered Storage Systems by Adaptive Request Distribution," 2006 15th IEEE International Conference on High Performance Distributed Computing, 2006, pp. 207-217.
Final Office Action dated Aug. 31, 2022 for U.S. Appl. No. 16/403,417, 37 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.

(56) References Cited

OTHER PUBLICATIONS

Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Office Action dated Sep. 3, 2021 for U.S. Appl. No. 16/803,913, 23 pages.
Office Action dated Jan. 25, 2022 for U.S. Appl. No. 16/803,913, 25 pages.
Office Action dated May 27, 2022 for U.S. Appl. No. 16/803,913, 24 pages.
RAID vs. non-RAID Storage—Difference & Comparison. https://www.fromdev.com/2014/01/raid-vs-non-raid-storage-difference.html, pp. 1-4, 2014. (Year: 2014).
Notice of Allowance dated Feb. 8, 2023 for U.S. Appl. No. 17/153,602, 27 pages.
Notice of Allowance dated Mar. 6, 2023 for U.S. Appl. No. 17/083,135, 111 pages.
Office Action dated Feb. 28, 2023 for U.S. Appl. No. 16/403,417, 36 pages.
Notice of Allowance received for U.S. Appl. No. 16/403,417, dated Jun. 12, 2023, 41 pages.

\* cited by examiner

MAPPED REDUNDANT ARRAY OF INDEPENDENT NODES EMPLOYING MAPPED RELIABILITY GROUPS FOR DATA STORAGE

TECHNICAL FIELD

The disclosed subject matter relates to data storage, more particularly, to storing data according to a logical mapped storage pool corresponding to real physical storage devices of at least one array of real physical storage devices.

BACKGROUND

Conventional data storage techniques can store data in one or more arrays of data storage devices. As an example, data can be stored in an ECS (formerly known as ELASTIC CLOUD STORAGE) system, such as is provided by DELL EMC. The example ECS system can comprise physical data storage devices, e.g., disks, etc., arranged in physical nodes, wherein physical nodes can be comprised in an ECS cluster. One use of data storage is in bulk data storage. Data can conventionally be stored in a group of physical nodes format for a given cluster, for example, in a conventional ECS system, all physical disks of physical nodes comprising the group of physical nodes are typically considered part of the group. As such, a physical node with many physical disks can, in some conventional embodiments, comprise a large amount of physical storage that can go underutilized. As an example, a storage group of five nodes, with ten disks per node, at 8 terabytes (TB s) per disk is roughly 400TB in size. This can be excessively large for some types of data storage, however apportioning smaller groups, e.g., fewer physical nodes, fewer physical disks, smaller physical disks, etc., can be inefficient in regards to processor and network resources, e.g., computing resource usage, to support these smaller physical groups. As such, it can be desirable to have more granular logical storage groups, e.g., 'mapped' groups, which can employ portions of larger physical groups, e.g., 'real' groups, thereby facilitating provision of smaller logical groups via the larger physical groups.

DETAILED DESCRIPTION

Figure 1:
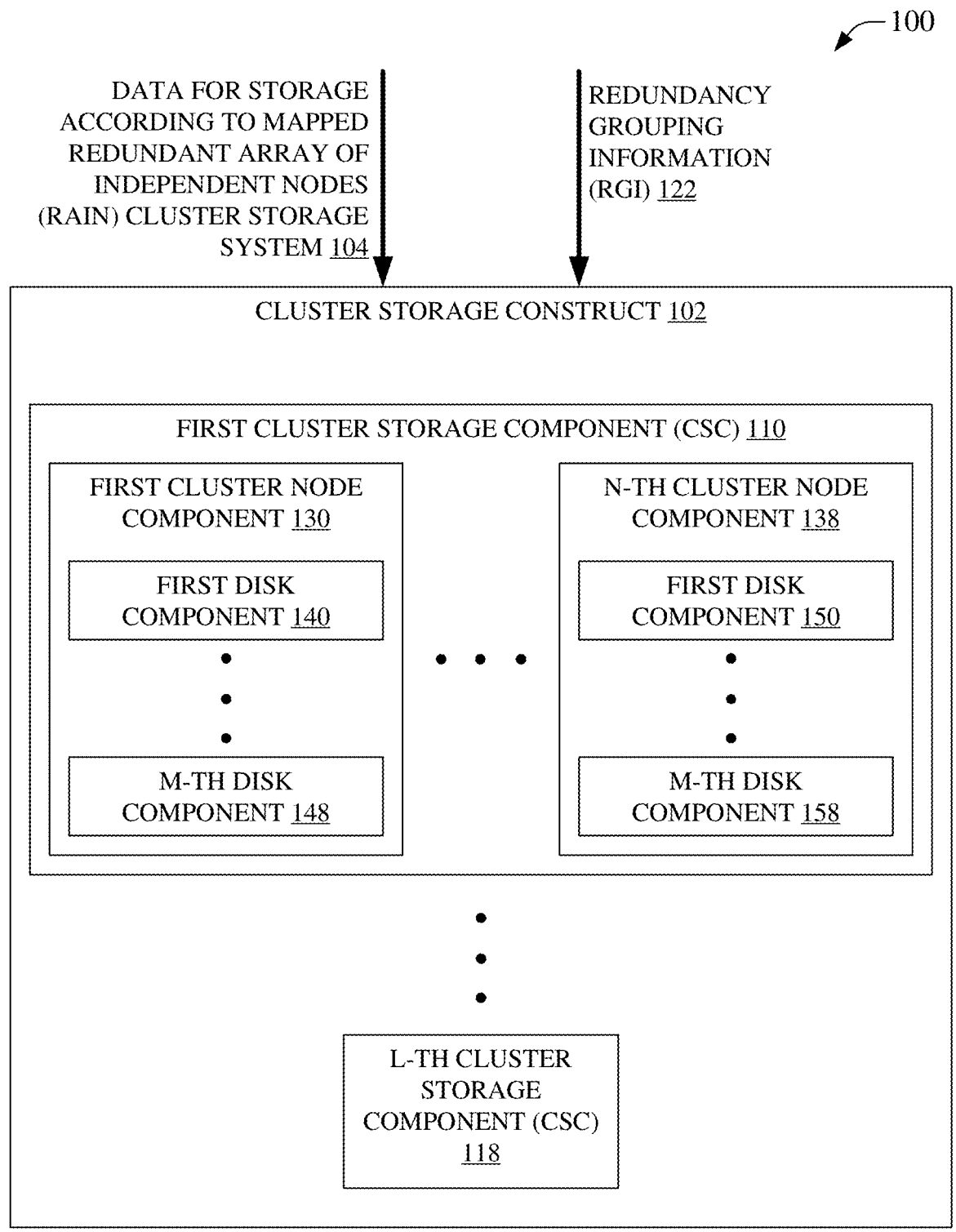
FIG. 1 is an illustration of an example system that can facilitate storage of data according to a mapped redundant array of independent nodes conforming to a mapped reliability group constraint, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of real storage devices. In an aspect, a mapped cluster can be embodied in a logical representation of physical storage elements and, as such, the term 'mapped,' as used herein, can indicate a logical representation of physical elements, generally termed 'real' elements herein, as an examples, a mapped node can be a logical representation of storage elements comprised in one or more real nodes, a mapped cluster can be comprised of mapped nodes comprising mapped disks, etc., that can be comprised of real, e.g., physical, storage elements that can be arranged in real nodes, comprising real disks, comprising real disk extents, etc. Accordingly, a mapped cluster can be defined so allow more granular use of real cluster storage elements that typically permitted in conventional storage techniques that generally form a real storage cluster from a plurality of real nodes. The finer granularity can be achieved, for example, by mapping portions of real nodes to a mapped cluster, thereby allowing use of less than an entire real node. In an aspect, a mapped cluster can comprise nodes that provide data redundancy, which, in an aspect, can allow for failure of a portion of real nodes supporting the mapped cluster without loss of access to stored data, can allow for removal/addition of one or more nodes from/to the mapped cluster without loss of access to stored data, etc. In an aspect, a mapped RAIN system can provide access to more granular storage in generally very large data storage systems, often on the order of terabytes, petabytes, exabytes, zettabytes, etc., or even larger, because each node can generally comprise a plurality of disks, unlike conventional technologies such as RAID technologies, e.g., mapped RAIN is fundamentally distinct from RAID technology.

In an embodiment, software, firmware, etc., can hide an abstraction mapping nodes for a mapped RAIN system, e.g., a group of portions of real nodes can appear to be a contiguous block of data storage in a mapped cluster even where, for example, the group of portions can be spread across parts of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide and M disks deep, a mapped RAIN can consist of up to N' mapped nodes and manage up to M' portions of disks of the constituent real nodes. It is noted that, in some embodiments, one or more of the N real nodes can have a different count of disks, e.g., M in a first real node can be of a different value than M in a second real node. It is further noted that the term 'M disks' is used as a convenience to represent a count, e.g., M, storage devices that can be disks, optical storage, solid state memory, or nearly any other form of data storage, without departing from the scope of the instant disclosure. Accordingly, in an embodiment, one mapped node can be expected to manage disks comprised in different real nodes. Similarly, in an embodiment, disks of one real node can be expected to be managed by mapped nodes of different mapped RAIN clusters. In some embodiments, the use of two disks by one real node can be forbidden to harden mapped RAIN clusters against a failure of one real node compromising two or more mapped nodes of one mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey a distinction from a corresponding real physical hardware component, e.g., a 'mapped' element is a logical representation of a 'real' physical element.

In an embodiment, a mapped cluster can be comprised in a real cluster, e.g., the mapped cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions comprises use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the mapped cluster can be smaller than the real cluster. Moreover, where the mapped cluster is sufficiently small in comparison to the real cluster, the real cluster can accommodate one or more additional mapped clusters. In an aspect, where mapped cluster(s) are smaller than a real cluster, the mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first cluster having hardware nodes in a first data center in Seattle, Washington, and a second data center having hardware nodes in Tacoma, Washington. As another example, a mapped cluster can comprise storage space from a first cluster having hardware nodes in a first data center in Houston, Texas, and a second cluster having hardware nods in a data center in Mosco, Russia. Geographically diverse storage system components can be communicatively coupled via one or more communication framework(s), e.g., communication framework 990, etc.

It is generally accepted that large-scale real storage systems can have higher hardware failure rates, for example, due to the typically higher count of hardware elements for a large system, e.g., if a device has a 1% failure rate per unit time, then a system with two device can be expected to have a failure every 50 time units, while a ten device system can be expected to have a failure every two time units, based on basic probability calculations. As such, the larger the storage system, generally the greater the likelihood of one or more hardware failures. While some protection via data redundancy can harden data storage against hardware failures, multiple contemporaneous hardware failures can still lead to a data loss event. In a real RAIN, a probability of multiple contemporaneous hardware failures can increase with cluster size, e.g., the more real nodes in cluster, the greater the likelihood that more than a threshold count of real node failures occurring can be and, a data loss probability can therefore also increase. Given that a mapped cluster is typically supported by a real cluster comprising a plurality of real nodes, for example a mapped cluster comprising store elements from four or more real nodes, etc., it can be desirable to compartmentalize data storage to limit damage from a possible data loss event occurrence. Moreover, because a large real cluster may accommodate a plurality of mapped clusters, compartmentalization can serve to increase reliability of data access for the several mapped clusters supported by a given real nodes of a real cluster. Groups of real nodes, e.g., a real cluster, are known to employ reliability groups to limit data loss probability in large real clusters, wherein a reliability group can include a subgroup of real cluster nodes, e.g., 16 nodes, and wherein different reliability groups do not have real node intersections. As such, every real node of a real cluster can be said to belong to exactly one reliability group. In an aspect, a reliability group can be regarded as a data protection domain that can store a data protection set that can comprise data and corresponding redundant data within a single reliability group. The data protection set can therefore provide, within the single reliability group, access to a representation of the data via the redundant data where the data otherwise becomes less accessible. This can avoid data loss in any particular reliability group. As an example, a data protection set can comprise data and corresponding erasure coding fragments, such that where a portion of the data becomes less accessible, the erasure coding fragments can facilitate data access, e.g., via recovering the less accessible data based on the erasure coding fragments and the remaining portions of the data. It is noted that additional layers of data protection can be employed, for example, replicating the data protection set in a remote physical location, in a distributed manner, etc., such that where the reliability group itself becomes compromised and the data can become less accessible via the corresponding compromised data protection set, then the data can be accessed via the example replica from the remote location.

A mapped reliability group can be a subset of mapped nodes that can belong to one mapped cluster. A mapped reliability group (MRG), analogous to a real reliability group (RRG), can be a data protection domain within a mapped cluster. In some embodiments, a mapped cluster can be supported via a single MRG, e.g., typically where a mapped cluster is small. In an aspect, a mapped cluster can be comprised of a plurality of mapped reliability groups, e.g., a large mapped cluster can be embodied across a plurality of MRGs. In an aspect, a mapped reliability group can be supported by a single real reliability group. In a further aspect, one mapped reliability group can be prohibited from being supported by two or more different real reliability groups. This can lead to the understanding that a reliability group of a mapped cluster can be mapped to a reliability group of a real cluster. Generally, it can be preferable to run different mapped reliability groups of one mapped cluster via different real reliability groups.

In an aspect, a real cluster can be divided real reliability groups, wherein each real reliability group can comprise a separate portion of the overall storage system disk pool. As such, a probability of any single real reliability group suffering a threshold count of hardware failures can be less than for the entire disk pool, e.g., the reliability grouping provides for the aforementioned compartmentalization of storage via a real cluster. A disk pool of a given real reliability group (that is disks from a corresponding group of nodes) can be said to contain no disks participating in any other real reliability group. In an aspect, the size of a real reliability group can be premised on criteria, for example, a count of disks per real node, a determined probability of disk failure, a determined time to recover from a disk failure, a determined probability of a real node failure, a determined time to recover from a real node failure, a selected level of fault tolerance, or other such criteria. As an example, here time to recover from a disk failure can be very low, a real reliability group can be larger because it is less likely that expected disk failures will compound to a level sufficient to compromise data access to the larger real reliability group. As a further example, where there is a lower fault tolerance, the real reliability group can be smaller to increase compartmentalization, e.g., smaller amounts of data are compromised in any fault and the increase compartmentalization can allow for alternate access to data, such as via a replica of the real reliability group at a remote location. In an aspect, a size of a real reliability group can be adapted, e.g., not static, however, altering a RRG size can affect a probability of a data loss event occurring. As such, altering a RRG size can generally be predicated on satisfying a probability rule for each mapped cluster MRG supported by said RRG. Moreover, provisioning of an RRG can be impacted by the topology of a data storage system, as an example, it can be beneficial to have all real nodes of one real reliability group connected to a first network switch, e.g., a first communication framework. In some embodiments, a plurality of real reliability groups can be connected to a first communication framework, e.g., when there are a large number of disks per real node, for example, 100+ disks, etc., subgroups of these disks can be provisioned into a plurality of RRGs of the example first communication framework, etc.

In an aspect, storage system topology can also support replication of protection sets via MRGs supported by remote RRGs. As an extended example, for two mapped reliability groups, A and B, storage services that execute on computing resources corresponding to mapped nodes of mapped reliability group A can perform storage operations, e.g., read, write, alter, delete, move, etc., within storage space corresponding to mapped reliability group B. This can be due to the mapped reliability groups still being a part of a mapped cluster, even where the mapped cluster employs a plurality of MRGs and, as such, it can be desirable to have efficient communication between MRG A and MRG B. As such, the storage system topology can be leveraged to enable resource allocation for the MRGs to reduce a communication framework distance between them. As such, in this example, MRGs A and B can be allocated from two real reliability groups connected to a first communication framework, e.g., a L1 switch, etc., to accommodate faster performance between the MRGs. However, where MRG is to be replicated, remotely locating the replica can be a best practice, e.g., reducing the likelihood that a local event affects access to both the MRG and the replica of the MRG. Accordingly, increasing the communication framework distance can be desirable, e.g., across an L2 switch, such that failure of the previous example L1 switch would not then result in unavailability of access to both data and the data replicate. As such, the storage system topology, and corresponding communication framework topologies, can again be leveraged to improve data reliability, accessibility, etc., e.g., it can be beneficial, in some instances, to have more reliable network switches of higher levels (L2+ switches) between mapped clusters connected with replication. The layout of mapped clusters and MRGS can be highly dependent on specific parameters and topologies. Simulations of cluster/reliability group layouts can be performed for situation specific parameters, e.g., as indicated by a system administrator, key performance indicators, customer demands, etc., to arrive at one or more preferred cluster/MRG layouts.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data according to a mapped redundant array of independent nodes conforming to a mapped reliability group constraint, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Cluster storage construct 102 can receive data for storage according to a mapped cluster, e.g., data for storage according to a mapped RAIN cluster storage system 104, etc., hereinafter data 104 for brevity. Data 104 can be stored by portions of the one or more physical, e.g., 'real,' storage devices of cluster storage construct 102 according to a logical 'mapping' of the physical storage space, e.g., according to one or more mapped clusters.

In an aspect, a mapped cluster can be a logical allocation of physical storage space, e.g., real storage space, within cluster storage construct 102. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc. Accordingly, in an embodiment, cluster storage construct 102 can support a mapped cluster enabling data 104 to be stored on one or more disk or portion thereof, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapped cluster schema. In an aspect, a mapped cluster control component, e.g., mapped cluster control component 220, 320, etc., can coordinate storage of data 104 on storage elements, e.g., disks, of a real cluster of cluster storage construct 102 according to a mapping of a mapped cluster, e.g., mapped cluster control component 220, 320, etc., can indicate where in cluster storage construct 102 data 104 is to be stored, cause data 104 to be stored at a location in cluster storage construct 102 based on the mapping of the mapped cluster, enable access to a location in cluster storage construct 102 based on mapping information to enable access to stored version of data 104, etc.

In an embodiment, a mapped cluster employing cluster storage construct 102 can be comprised in one or more portions of one or more real cluster, e.g., a portion of one or more disks of first CSC 110-L-th CSC 118, etc. Moreover, the mapped cluster can be N' nodes by M' disks in size and the one or more real clusters of cluster storage construct 102 can be N nodes by M disks in size, where N' can be less than, or equal to, N, and M' can be less than, or equal to, or greater than, M. In these other embodiments, the mapped cluster can be smaller than cluster storage construct 102. Moreover, where the mapped cluster is sufficiently small in comparison to cluster storage construct 102, one or more additional mapped clusters can be accommodated by cluster storage construct 102. In an aspect, where mapped cluster(s) are smaller than cluster storage construct 102, the mapped cluster can provide finer granularity of the data storage system. As an example, where cluster storage construct 102 is 8×8, e.g., 8 nodes by 8 disks, then, for example, four mapped 4×4 clusters can be provided, wherein each of the four mapped 4×4 clusters is approximately ¼th the size of cluster storage construct 102. As a second example, given an 8×8 cluster storage construct 102, 16 mapped 2×2 clusters can be provided where each mapped cluster is approximately ¹⁄₁₆th the size of cluster storage construct 102. As a third example, for the example 8×8 cluster storage construct 102, two mapped 4×8 or 8×4 clusters can be provided and each can be approximately ½ the size of cluster storage construct 102. Additionally, the example 8×8 cluster storage construct 102 can provide a mix of different sized mapped clusters, for example one 8×4 mapped cluster, one 4×4 mapped cluster, and four 2×2 mapped clusters. In some embodiments, not all of the storage space of cluster storage construct 102 must be allocated in a mapped cluster, e.g., an example 8×8 cluster storage construct 102 can comprise only one 4×4 mapped cluster with the rest of cluster storage construct 102 being unallocated, differently allocated, etc.

In some embodiments, a mapped cluster can comprise storage space from more than one real cluster, e.g., first CSC 110 through L-th CSC 118 of cluster storage construct 102. In some embodiments, a mapped cluster can comprise storage space from real nodes, e.g., first cluster node component 130, etc., in different geographical areas. In some embodiments, a mapped cluster can comprise storage space from more than one real cluster in more than one geographic location. As an example, a mapped cluster can comprise storage space from a cluster having hardware nodes in a data center in Denver, e.g., where first CSC 110 is embodied in hardware of a Denver data center. In a second example, a mapped cluster can comprise storage space from a first cluster having hardware nodes in a first data center in Denver and from a second cluster also having hardware nodes in the first data center in Denver e.g., where first CSC 110 and L-th CSC 118 are embodied in hardware of a Denver data center. As a further example, a mapped cluster can comprise storage space from both a cluster having hardware nodes in a first data center in Denver and a second data center in Denver e.g., where first CSC 110 is embodied in first hardware of a first Denver data center and where L-th CSC 118 is embodied in second hardware of a second Denver data center. As a further example, a mapped cluster can comprise storage space from a first cluster having hardware nodes in a first data center in Seattle, Washington, and a second data center having hardware nodes in Tacoma, Washington, e.g., where first CSC 110 is embodied in first hardware of a first Seattle data center and where L-th CSC 118 is embodied in second hardware of a second Tacoma data center. As another example, a mapped cluster can comprise storage space from a first cluster having hardware nodes in a first data center in Houston, Texas, and a second cluster having hardware nods in a data center in Mosco, Russia e.g., where first CSC 110 is embodied in first hardware of a first Houston data center and where L-th CSC 118 is embodied in second hardware of a second Mosco data center. Communication between components of cluster storage construct 102 can be via one or more communication frameworks, for example, via communication framework 392, 394, 396, 492, 494, 496, 592-1, 592, 594-1, 594, 596-1, 596, 692-1, 692, 694-1, 694, 696-1, 696, 990, etc.

In an aspect, a mapped cluster control component, e.g., 220, 320, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', and said supplemental information can be used to allocate mapped storage space in a mapped cluster. In some embodiments, allocation can be unconstrained, e.g., any space of cluster storage component 102 can be allocated into a mapped cluster. In other embodiments, constraints can be applied, e.g., a constraint can be employed by a mapped cluster control component to select or reject the use of some storage space of cluster storage construct 102 when allocating a mapped cluster. Other constraints can be readily appreciated, for example, based on a type of data redundancy schema, based on available/use storage space, based on network/computing resource costs, etc., and all such constraints are within the scope of the instant disclosure even where not recited for clarity and brevity. In an aspect, supplemental information can comprise, redundancy grouping information, e.g., RGI 122, 222, 322, etc., which can facilitate determining a size, topology, or other characteristic of a real redundancy group (RRG), mapped redundancy group (MRG), or combination thereof.

Figure 2:
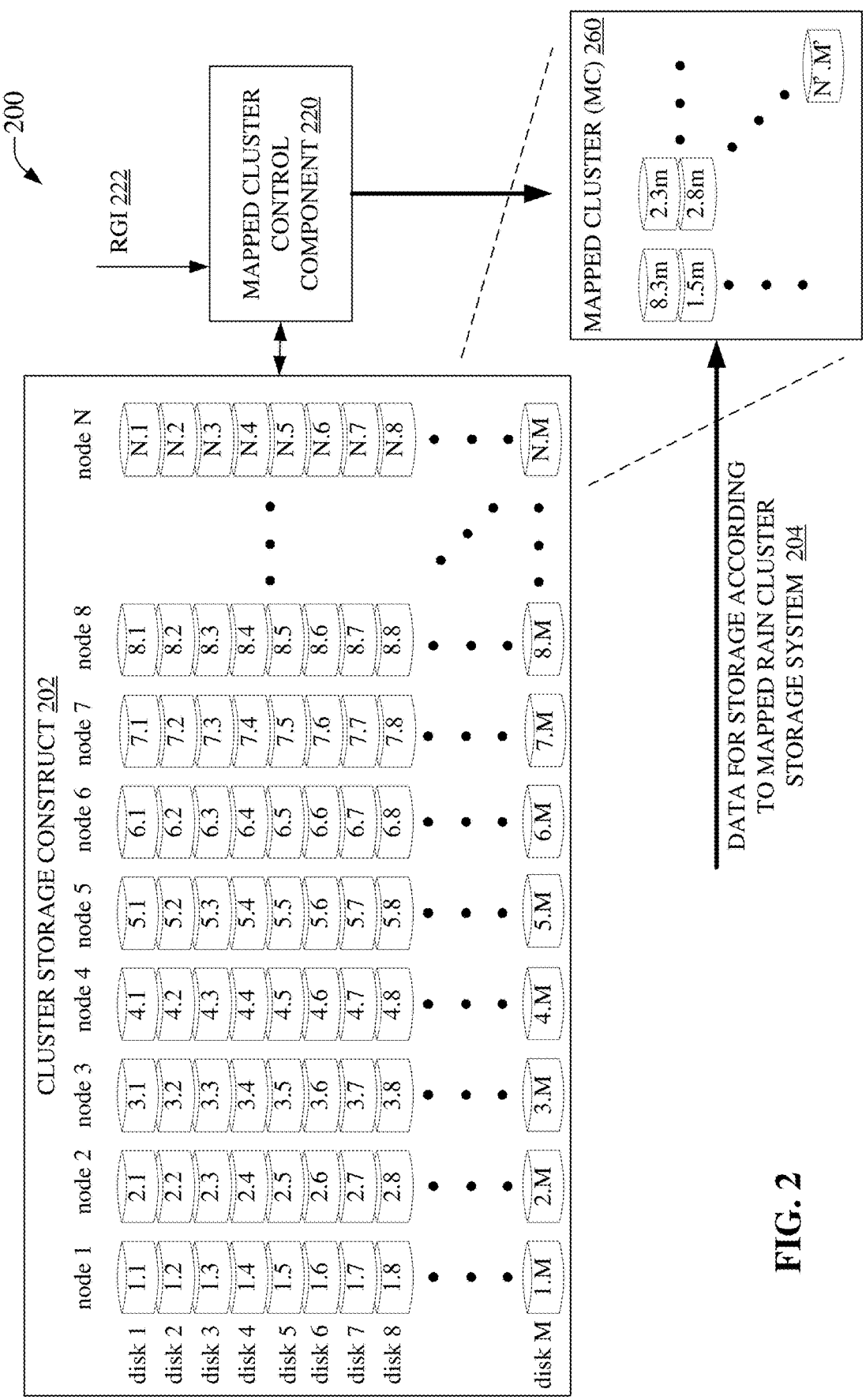
FIG. 2 is an illustration of an example system that can facilitate storage of data according to a mapped redundant array of independent nodes implemented via a mapped cluster control component based on reliability group information, in accordance with aspects of the subject disclosure.

FIG. 2 is an illustration of a system 200, which can enable storage of data according to a mapped redundant array of independent nodes implemented via a mapped cluster control component based on reliability group information, in accordance with aspects of the subject disclosure. System 200 can comprise cluster storage construct 202 that can be the same as, or similar to, cluster storage construct 102. Cluster storage construct 202 is illustrated at the disk and node level for ease of understating, e.g., disk 1.1 of disk 1 and node 1, for example, can be embodied in first disk component 140, disk 2.1, for example, can be embodied in first disk component 150, disk N.M, for example, can be embodied in a disk component of L-th CSC 118, etc. As is illustrated in this example embodiment, cluster storage construct 202 can comprise N nodes of M disks, e.g., disk 1,1 to N.M, etc.

Mapped cluster control component 220 can be communicatively coupled to, or be included in, cluster storage construct 202. Mapped cluster control component 220 can allocate mapped cluster (MC) 260, which can logically embody storage comprised in cluster storage construct 202. In an embodiment, MC 260 can be allocated based on supplemental information, which can comprise RGI 222. As an example, supplemental information can indicate a first amount of storage is needed and mapped cluster control component 220 can determine a number of, and identity of, disks of cluster storage construct 202 that meet the first amount of storage. In this example, mapped cluster control component 220 can accordingly allocate the identified disks as MC 260, e.g., disk 8.3$m$ can correlate to an allocation of disk 8.3, 2.3$m$ can correlate to an allocation of disk 2.3, . . . , disk N'.M' can correlate to an allocation of disk N.M, etc.

Mapped cluster control component 220 can facilitate storage of data 204 via cluster storage construct 202 according to MC 260, which can logically represent the allocated storage areas of cluster storage construct 202. As such, data 204 can be stored in a more granular storage space than would conventionally be available, e.g., to store data 204 in node 1 conventionally all disks of node 1 would be allocated even where the 1 to M available disk storage space of node 1 can far exceed an amount of storage needed. As such, by mapping portions of a disk from a node into MC 260, a lesser amount of storage space can be made available for storing the example first amount of storage. As an example, where a conventional storage cluster can allocate a minimum block of 1.2 petabytes, this can far exceed the example first amount of storage, such as where the first amount of storage can be related to storing a log file, moving data units from legacy systems that employed smaller storage unit sizes, etc., and accordingly, allocating and facilitating storage of data according to MC 260, where MC 260 can have minimum block sizes less than the example 1.2 petabytes, can be desirable.

Figure 3:
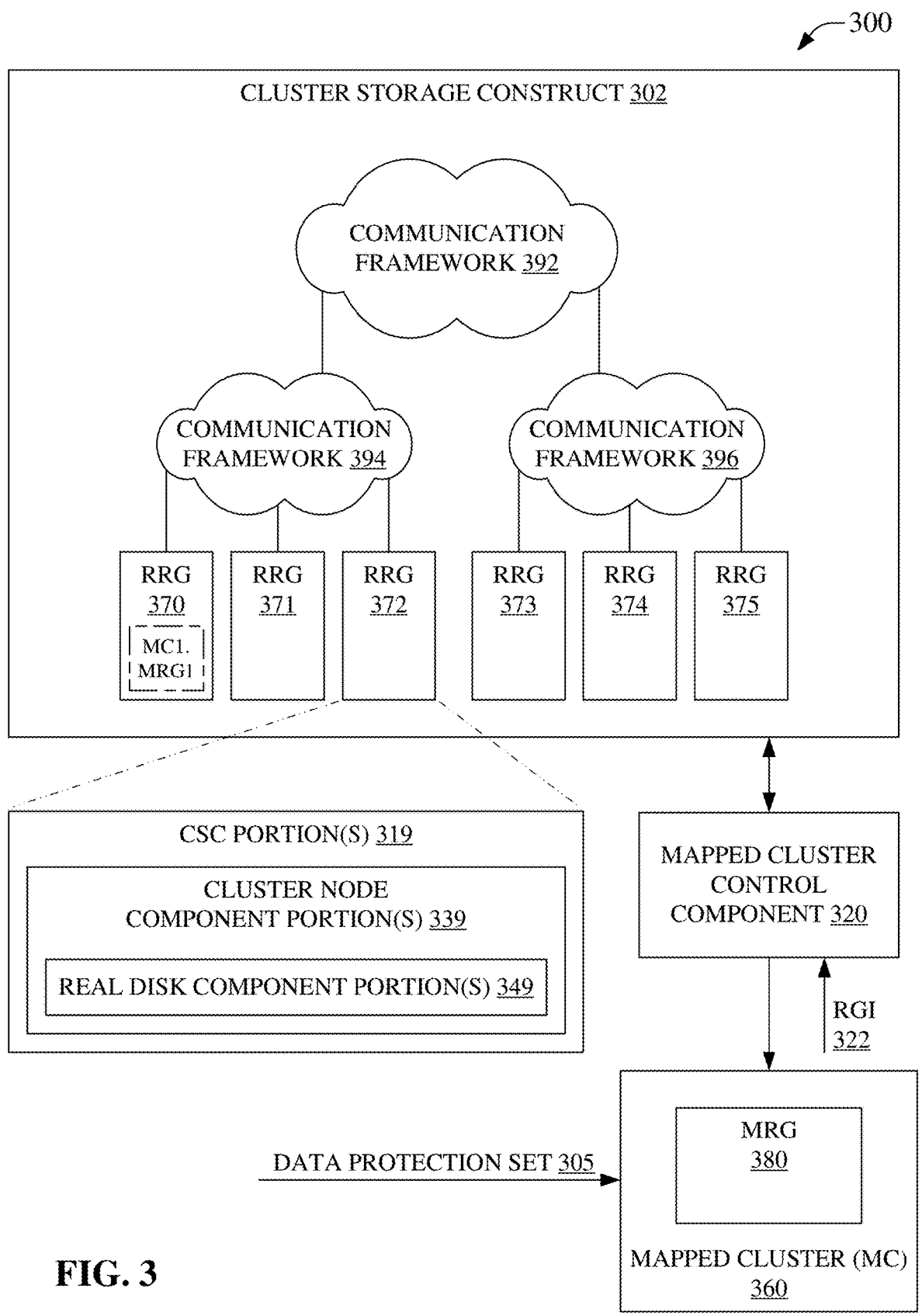
FIG. 3 is an illustration of an example system that can enable storage of data according to a mapped redundant array of independent nodes conforming to a mapped reliability group constraint that corresponds to a real reliability group constraint, in accordance with aspects of the subject disclosure.

FIG. 3 is an illustration of a system 300, which can facilitate storage of data according to a mapped redundant array of independent nodes conforming to a mapped reliability group constraint that corresponds to a real reliability group constraint, in accordance with aspects of the subject disclosure. System 300 can comprise cluster storage construct 302 that can comprise disk portions in a manner that is the same as, or similar to, cluster storage construct 102, 202, etc. Mapped cluster control component 320 can allocate one or more MC, e.g., MC 360, etc., which allocation can be based on supplemental information, as disclosed elsewhere herein, which can include RGI 322. In an aspect, mapped cluster control component 320 can designate a mapped cluster size, location, topology; a mapped reliability group size, location, topology; a real reliability group size, location, topology; and other characteristics corresponding to provisioning RRGs, MRGs, MCs, or combinations thereof, based on RGI 322. As an example, RGI 322 can be employed to determine a size of an RRG via mapped cluster control component 320. Mapped cluster control component 320, for example, can also allocate a mapped cluster. Additionally, mapped cluster control component 320, for example, can designate one or more MRG for a mapped cluster such that each MRG of the mapped cluster is within an RRG. Moreover, in these examples, mapped cluster control component 320 can facilitate altering an RRG/MRG/MC size, location, topology, etc.

In an embodiment, data protection set 305 can comprise data, e.g., data 104, 204, etc., data protection information, for example, convolved chunks, erasure coding fragments, etc., or combinations thereof. Generally, data protection set 305 can be stored in cluster storage construct 302 according within an RRG corresponding to MRG 380. Whereas an MRG, e.g., MRG 380, typically comprises storage and computing resources constrained within only one RRG, e.g., RRG 370-375, etc., data protection set 305 can be stored in a single RRG, e.g., RRG 370-375, for example in physical storage elements comprising MC1.MRG1 of RRG 370. Accordingly, MRG 380 of MC 360 can be said to correspond to, or map to, the physical storage elements MC1.MRG1 of RRG 370, wherein RRG 370 can comprise one or more real disk of one or more real node of one or more real cluster.

In an aspect, an RRG, e.g., RRG 370-375, etc., can comprise one or more CSC portion(s) 319, e.g., portions of one or more CSC. Moreover, each of the one or more CSC portion(s) 319 can comprise one or more cluster node component portion(s) 339, e.g., portions of one or more cluster node components. Further, each cluster node component portion 339 can comprise one or more real disk component portion(s) 349, e.g., portions, extents, etc., of one or more real disks. As such, the physical storage elements comprised in MC1.MRG1 of RRG 370, can correspond to nearly any physical storage element of CSC 302. However, due to the physical storage elements comprising MC1.MRG1 being in RRG 370, the physical storage elements can be constrained to be within the physical storage elements providing compartmentalization of data storage within CSC 302. In an extreme example, all physical storage elements of CSC 302 can be comprised in a single RRG, whereby the example RRG would provide the same compartmentalization as not having any RRGs at all. In an opposite extreme example, each physical storage element of CSC 302 can be assigned to a separate RRG, whereby the cluster can become meaningless as each physical storage element can be treated as independent. However, meaningful examples can exist anywhere between these two extreme examples, for example, illustrating that CSC 302 comprises six RRGs, whereby some or all of the physical storage elements of CSC 302 can correspond to one of the six RRGs. In the illustrated example, if there are 600 physical storage elements each having a 1% predicted failure rate per unit time, and these are evenly allocated to the six RRGs, then each RRG can be determined to have a one physical storage element fail in each unit time. Where each RRG stores data, for example, according to a protection scheme that can tolerate the loss of any two physical storage elements, and a time to recover a failed physical storage element is one unit time, then it can be predicted that data of CSC 302 can always be available, e.g., even where one physical storage element fails in an RRG, it can be recovered in one unit time, e.g., before more than two failures in the same RRG occur. This can be viewed as the repair rate keeping up with the failure rate. However, this can be contrasted to another example that can use only three RRGs, whereby these RRGs would each have 200 physical storage elements and at the 1% failure rate, would have two failures in any unit time. Accordingly, after the first unit time in each of the three example RRGs, there can be two failures, after the second unit time there can be two more failures and one recovery resulting in a total of three failures. In this example, all of the RRGs can exceed the two failure tolerance after two units of time. Other examples can be readily appreciated. It is noted that the 1% failure rate is simply a determined probability and therefore it is not guaranteed that a physical storage element will fail, but failures can be expected to occur in accord with well determined failure probabilities.

In an aspect, CSC 302 can comprise one or more communication framework, e.g., communication framework (CF) 392, 304, 396, etc. In an aspect, CFs can be of one or more levels. As an example, CF 394 can be a local area network at a first data center in Seattle while CF 396 can be wide area network interconnecting a plurality of data centers in Boston, while CF 392 can comprise an intent connection enabling access to any of the physical storage elements of RRGs 370-375 via CF 392, 394, 396, or combinations thereof. In another aspect, CSC 302 can be embodied in a large data center, wherein CF 392 can comprise L2+ switches that can connect to CF 349 and 396 that can comprise L1 switches enabling access to physical storage elements on server racks embodying RRG 370 to 375. In these examples, it can be understood that access to data between RRGs 370 and 371, which can traverse CF 394, can be appreciably faster than between RRG 370 and 373 which can traverse each of CF 394, 392, and 396.

Figure 4:
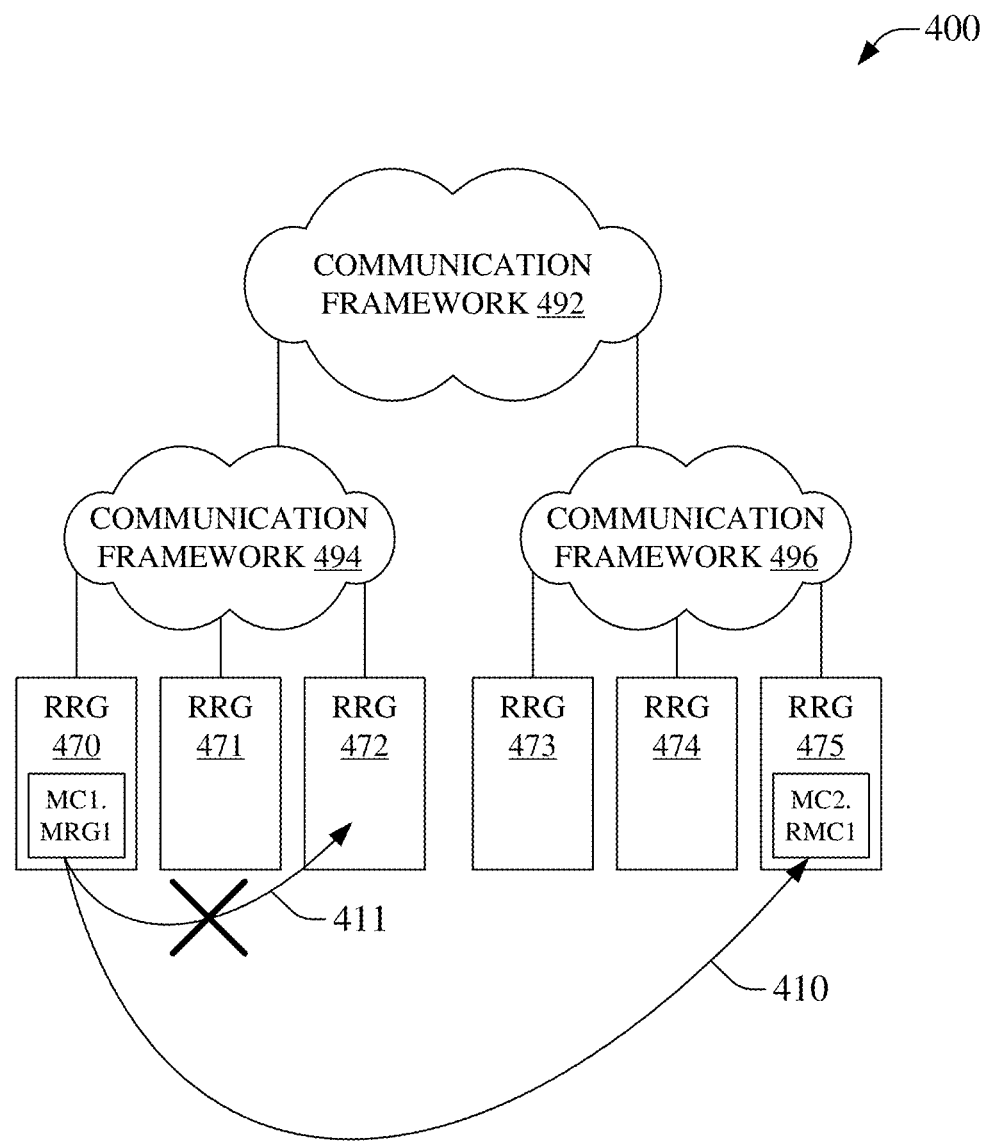
FIG. 4 illustrates an example system that can facilitate storage of data according to a mapped redundant array of independent nodes conforming to a mapped reliability group constraint and can facilitate data replication via a corresponding preferred data replication scheme, in accordance with aspects of the subject disclosure.

FIG. 4 is an illustration of a system 400, which can enable storage of data according to a mapped redundant array of independent nodes conforming to a mapped reliability group constraint and can facilitate data replication via a corresponding preferred data replication scheme, in accordance with aspects of the subject disclosure. System 400 can comprise one or more RRGs, e.g., RRG 470-475, etc., which can be communicatively coupled via CFs, e.g., CF 492-496. RRGs 470-475 can compartmentalize physical storage elements of a cluster storage construct, e.g., 102, 202, 302, etc. In an aspect, the topology, size, and other characteristics of each of the RRGs can be based on redundancy grouping information, e.g., RGI 122, 222, 322, etc., for example, a count of disks per real node, a determined disk failure probability, a determined node failure probability, a determined disk recovery time, a determined node recover time, a designated level of fault tolerance, a minimal number of real nodes to provide a designated level of data protection via a data protection set, e.g., data protection set 305, etc., or other information corresponding to determining an appropriate RRG characteristic. As an example, where a data protection set, e.g., data protection set 305, etc., can require at least four mapped nodes, the four mapped nodes can correspond to at least four real nodes, whereby the corresponding MRG and RRG minimum size can comprise four mapped nodes or four real nodes correspondingly. As a further example, an RRG, and correspondingly an MRG, can be larger for less sensitive fault tolerance levels, e.g., where data can be accessed despite a greater number of contemporaneous faults, the RRG can be larger than where fewer faults can be tolerated. In an example, where a data protection set employs a 12+4 erasure coding (EC) scheme, the loss of any four fragments can be tolerated, which can less sensitive than a 4+2 erasure coding scheme tolerating the loss of any two fragments and, accordingly, the 12+4 EC scheme can employ larger RRGs than the 4+2 EC scheme because, all else being the same, it is less likely that an RRG will encounter four contemporaneous faults than two. Other examples are to be appreciated based on other RGIs, all of which are expressly within the scope of the instant disclosure despite note being explicitly recited for the sake of clarity and brevity.

In an aspect, a mapped cluster can be provisioned within an RRG, e.g., RRG 270, where the size of the mapped cluster is less than that available in the RRG. Accordingly, the mapped cluster can be associated with a mapped redundancy group corresponding to the real redundancy group, e.g., as mapped cluster 1 according to mapped redundancy group 1 'MCLMRG1' which can be within real redundancy group 470. One or more data protection sets, e.g., data protection set 305, etc., can be stored in RRG 370 in accord with MC1.MRG1. As has been disclosed, the data protection set can provide a first level of data hardening that can protect against some loss of access, for example, where data is encoded according to a 12+4 EC scheme, then data in MC1.MRG1 can facilitate access to data even where up to four fragments of the corresponding data protection set are less available. Accordingly, even where RRG 470, for example, can suffer a hardware fault that can reduce access to a data fragment, the redundancy of the data protection set can enable access to the data. However, it can be possible that RRG 470 can suffer from sufficient access issues, for example reduced access to five data fragments, such that data becomes less accessible via MC1.MRG1.

In an aspect, it can be desirable to replicate MC1.MRG1 to provide access to data, for example, where contemporaneous failures within RRG 470 prevent access to data stored in MC1.MRG1. A replicate of MC1.MRG1 can be stored via another RRG, for example RRG 472 or RRG 475. In an aspect, the topology of system 400 can result in the replicate being stored via RRG 475 as mapped cluster 2 according to replicated mapped cluster 1 'MC2.RMC1' as indicated by arrow 410. By placing a replicate of the MC1 from RRG 470 at RRG 475, for example, loss of CF 494 can fail to prevent access to data. In contrast, were replication to RRG 472 to be performed, loss of access via CF 494 would result in loss of access to the data stored in MC1.MRG1 stored in RRG 4701 or a replicate stored in RRG 472. As such, the topology of system 400 can be considered in provisioning of MRGs for MCs and corresponding replicated MCs.

Figure 5:
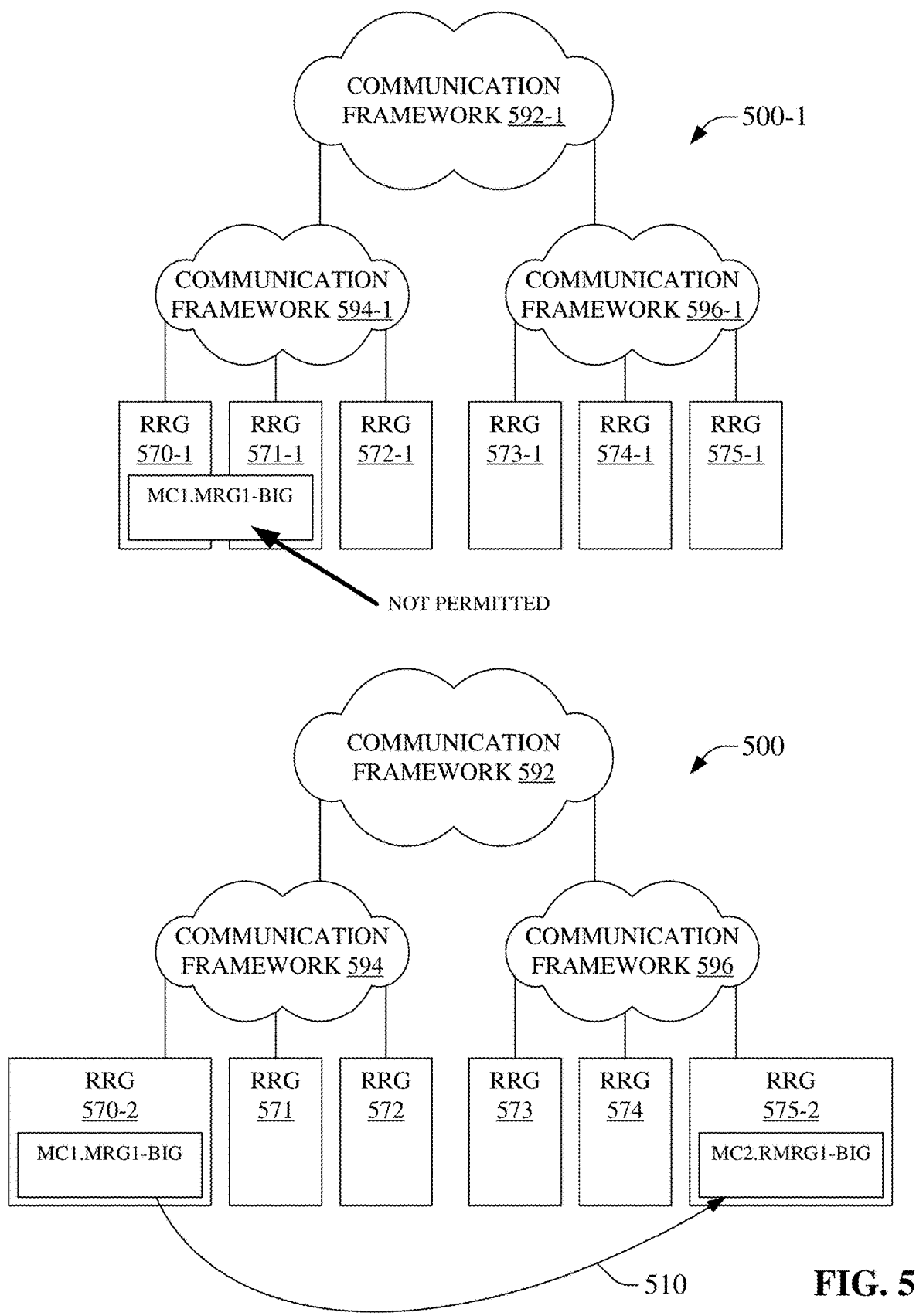
FIG. 5 illustrates an example system that can facilitate storage of more than a threshold amount of data according to a mapped redundant array of independent nodes conforming to an adapted mapped reliability group constraint, in accordance with aspects of the subject disclosure.

FIG. 5 is an illustration of a system 500, which can enable storage of more than a threshold amount of data according to a mapped redundant array of independent nodes conforming to an adapted mapped reliability group constraint, in accordance with aspects of the subject disclosure. In an aspect, a mapped cluster can grow or shrink in size, for example, as data is added or removed from the mapped cluster, customer agreements change, etc. In some instances the mapped cluster can grow to be larger than the storage space of a provisioned RRG.

System 500-1 can comprise one or more RRGs, e.g., RRG 570-1 to 575-1, etc., which can be communicatively coupled via CFs, e.g., CF 592-1 to 596-1. RRGs 570-1 to 575-1 can compartmentalize physical storage elements of a cluster storage construct, e.g., 102, 202, 302, etc. In an aspect, the topology, size, and other characteristics of each of the RRGs can be based on redundancy grouping information, e.g., RGI 122, 222, 322, etc., in a manner that can be the same as, or similar to system 400, etc.

In an aspect, where MC1.MRG1 of system 400 can grow in size, for example to MC1.MRG1-BIG, the mapped cluster can exceed the size of RRG 570-1 and can attempt grow into RRG 571-1. However, where an MRG can be defined as not employing computing resources external to an RRG, this type of expansion into MC1.MRG1-BIG can be prohibited. However, an alternate can be to increase the size of the RRG corresponding to the MRG.

Turning to example system 500, it can be observed that RRG 570-2 can be expanded to facilitate the growth of MC1.MRG1-BIG, e.g., RRG 570-1 of system 500-1 can be expanded to RRG 570-2 in system 500. As such, replication via 510 to store a replicate in RRG 575-2 as MC2.RMG1-BIG can correspondingly increase the size of RRG 575-2. It is noted that increasing the size of an RRG can be limited by a determined maximum RRG size based on RGI, e.g., 122, 222, 322, etc. In an aspect, increasing the size of an RRG can result in increasing the likelihood of a failure in the RRG and thus increasing a likelihood of a data loss event. Where this increase in a data loss event is determined to be unacceptable, growth of an RRG to accommodate an increasing mapped cluster size, and the corresponding MRG size, can be unacceptable. In an aspect, another solution can be needed to accommodate growing mapped cluster sizes.

Figure 6:
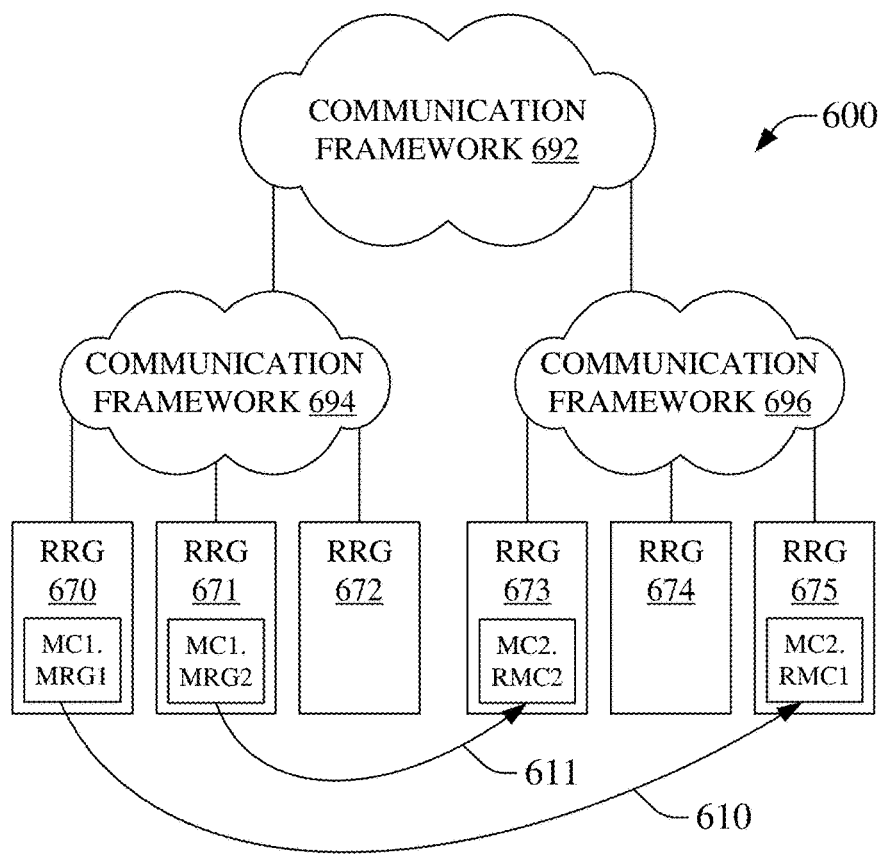
FIG. 6 illustrates an example system that can facilitate storage of more than a threshold amount of data according to a mapped redundant array of independent nodes conforming to a mapped reliability group constraint, in accordance with aspects of the subject disclosure.
Figure 6:
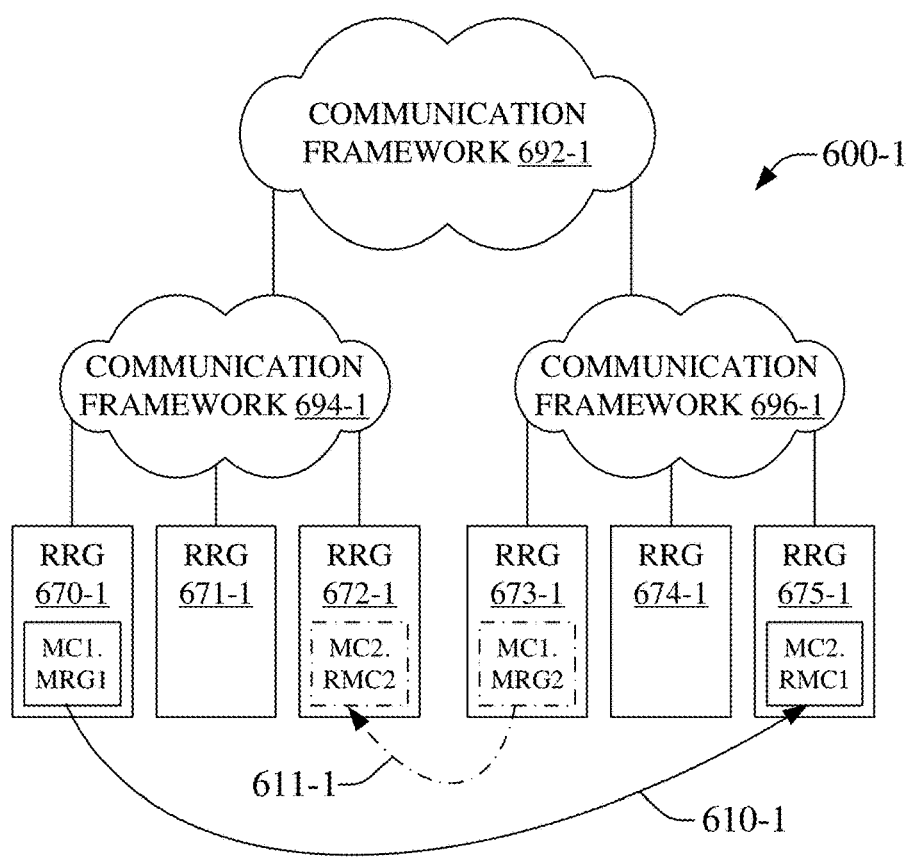

FIG. 6 is an illustration of a system 600 that can facilitate storage of more than a threshold amount of data according to a mapped redundant array of independent nodes conforming to a mapped reliability group constraint, in accordance with aspects of the subject disclosure. System 600 can comprise one or more RRGs, e.g., RRG 670 to 675, etc., which can be communicatively coupled via CFs, e.g., CF 692 to 696. RRGs 670 to 675 can compartmentalize physical storage elements of a cluster storage construct, e.g., 102, 202, 302, etc. In an aspect, the topology, size, and other characteristics of each of the RRGs can be based on redundancy grouping information, e.g., RGI 122, 222, 322, etc., in a manner that can be the same as, or similar to system 400, etc.

System 600 can illustrate expansion of a mapped cluster via employment of an additional MRG. In system 600, the mapped cluster corresponding to MC1.MRG1 in RRG 670 can be expanded. This expansion, can avoid extending a MRG beyond the boundaries on RRG 670, e.g., avoiding the expansion illustrated for MC1.MRG1-BIG across RRG 570-1 and 571-1 of system 500-1. Moreover, the expansion can avoid increasing the size of an RRG, for example increasing the size of RRG 570-2 to accommodate the increase in size of the mapped cluster MC1.MRG1-BIG in RRG 570-2 of system 500. In the alternative, in system 600, an additional MRG can be added to the mapped cluster, e.g., mapped cluster 'MC 1' can now comprise storage according to 'MRG1' and 'MRG2'. In an aspect, the additional MRG, e.g., MRG2, can be added in an additional RRG, e.g., RRG 671. Accordingly, MRG2 does not violate the rule against an MRG employing computing resources from outside a single RRG. In system 600, rather than resulting in MC1.MRG1-BIG as in systems 500-1 and 500, MC1.MRG1 and MC1.MRG2 can be employed in RRG 670 and 671 correspondingly. As is further illustrated in example system 600, MC1.MRG1 and MC1.MRG2 can be kept more proximate to each other than to replicas of MC1.MRG1 and MC1.MRG2, e.g., MC1.MRG1 and MC1.MRG2 can be under CF 694 to enable more rapid intercommunication. It can be appreciated that where both MC1.MRG1 and MC1.MRG2 are part of a same mapped cluster, e.g., MC1, then improved communication can be of higher priority than increased spatial diversity to better harden data against loss. However, where it can also be valuable to harden data against loss, for example reduced data access in both RRG 670 and 671 due to an event affecting CF 694, replicas of MC1.MRG1 and MC1.MRG2 can be generated at more remotely located RRGs, e.g., as MC2.RMC1 and MC2.RMC2 correspondingly at RRG 675, via 610, and RRG 673 via 611. In addition to being effective at allowing expansion of mapped cluster MC1, this example system can also avoid complications that can be associated with expanding an RRG, e.g., even though expanding an RRG can be possible it can be a more complicated operation and it can simply be easier to avoid the more complicated operation.

Example system 600-1 can illustrate that the expansion of mapped cluster MC1 can be performed according to a different topology, e.g., adding MC1.MRG2 to RRG 673-1. However, this alternate topology can result in communicating data between RRG 670-1 and 673-1 via CF 694-1, 692-1, and 696-1 as part of operating mapped cluster MC1. In another aspect, system 600-1 further illustrates that replicates of the MRGs for MCl can occur according to an alternate topology, e.g., the replication via 610-1 can mirror that in 610 for system 600. However, replication 611-1 can cause the replicate of MC1.MRG2 to be written to RRG 672-1 as MC2.RMC2. In this aspect, failures affecting CF 694-1, for example, can restrict access to MC1.MRG1 and MC2.RMC2, however the data can be otherwise accessed via MC1-MRG2 and MC2.RMC1. As such, the alternate replication topology can be functional, but the displacement of MC1.MRG1 and MC1.MRG2 into different branches of the CF topology can present result in effects on the storage system that can be avoided by modeling expansion after example system 600.

Figure 7:
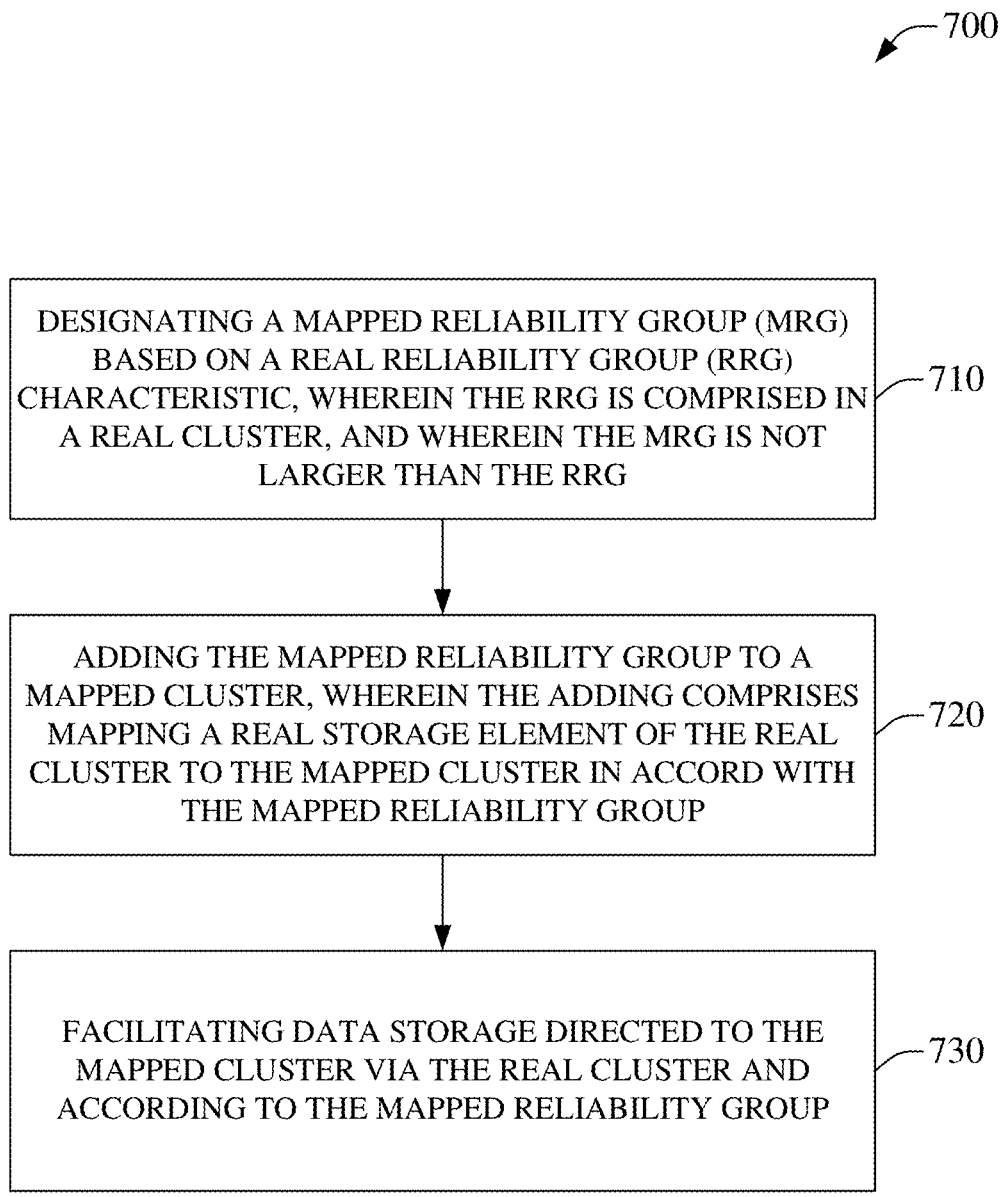
FIG. 7 is an illustration of an example method facilitating storage of data according to a mapped redundant array of independent nodes conforming to a mapped reliability group constraint, in accordance with aspects of the subject disclosure.
Figure 8:
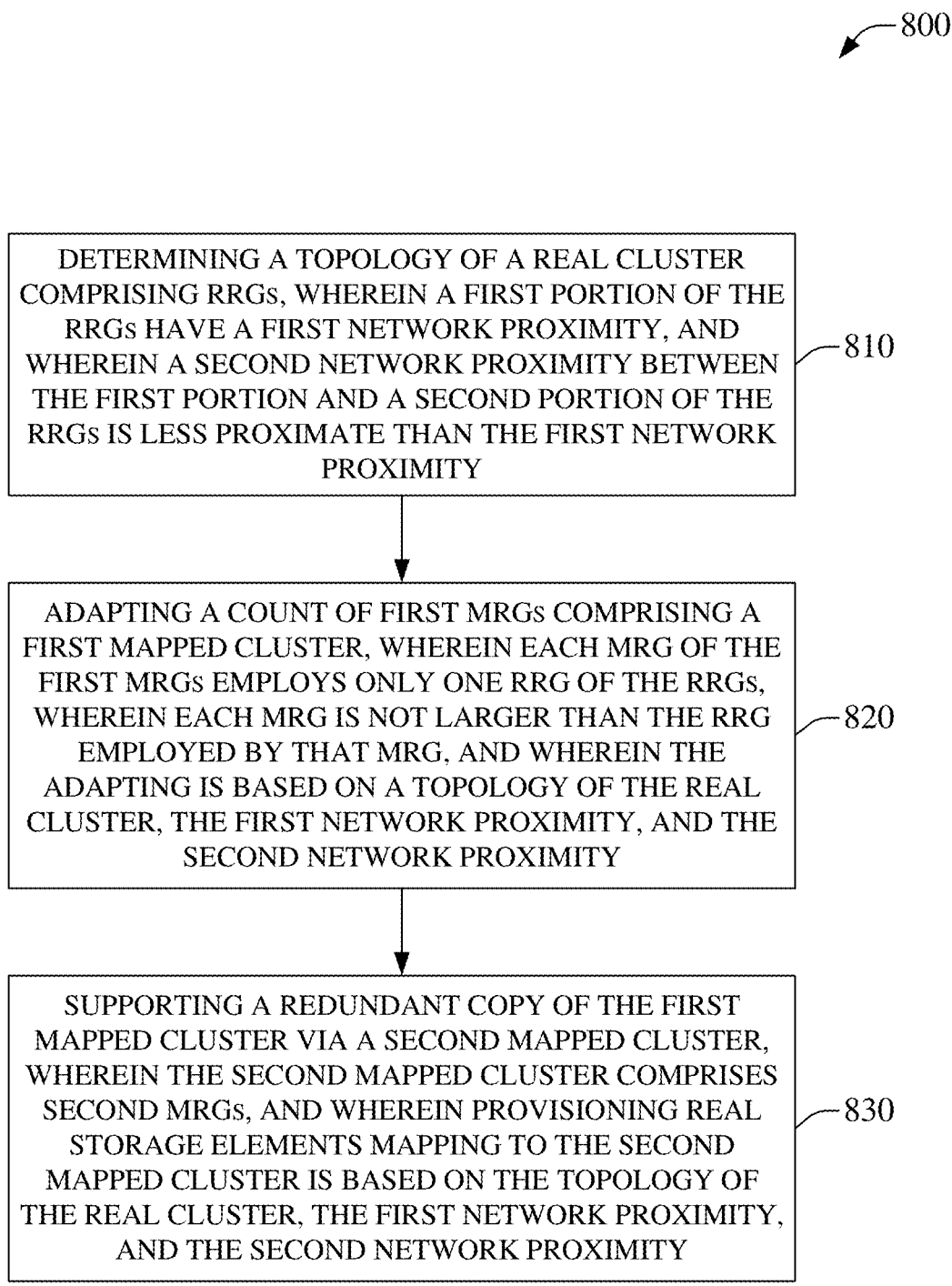
FIG. 8 illustrates an example method that enables storage of data according to a mapped redundant array of independent nodes in accord with adapting a count of mapped reliability group constraints, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate storage of data according to a mapped redundant array of independent nodes conforming to a mapped reliability group constraint, in accordance with aspects of the subject disclosure. At 710, method 700 can comprise designating a mapped reliability group (MRG) based on a real reliability group (RRG) characteristic, wherein the RRG is comprised in a real cluster, and wherein the MRG is not larger than the RRG. In an aspect, a mapped cluster control component, e.g., 220, 320, etc., can facilitate deployment of a RRG, adapting an RRG location, size, topology, etc., or other operations related to forming, employing, adapting, removing, RRGs in a cluster storage system. In an aspect, an RRG can provide sufficient storage space in a topology that can enable a mapped storage cluster, and more particularly, a mapped storage cluster in accord with a MRG. Moreover, the RRG can be sized to provide a desired level of compartmentalization for a cluster storage system. As such, the RRG can have a topology providing between a determined minimum and maximum size, diversity of real nodes, geographic diversity, or other RRG characteristic, based on for example, a count of disks per real node, a determined disk failure probability, a determined node failure probability, a determined disk recovery time, a determined node recover time, a designated level of fault tolerance, a minimal number of real nodes to provide a designated level of data protection via a data protection set. The RRG can support one or more MRGs, although as noted elsewhere herein each MRG can be supported by only one RRG, wherein an MRG the one or more MRGs does not exceed the bounds of the RRG. The designated MRG can be available for storing data, e.g., of a data protection set, via the RRG according the MRG topology.

Method 700, at 720, can comprise adding the mapped reliability group to a mapped cluster, wherein the adding comprises mapping a real storage element of the real cluster to the mapped cluster in accord with the mapped reliability group. As an example, a mapped cluster can comprise data storage according to a first and a second MRG, wherein the first and second MRG can be embodied in a first RRG, and wherein a first and a second data protection set are stored via the mapped cluster. Accordingly, in this example, where both the first and second MRG are supported by the first RRG, then the sum of the space of the first and second MRGs can be smaller than that of the RRG. Furthermore in this example, the first data protection set can be stored via the RRG according to the first MRG of the mapped cluster, and the second data protection set can be stored via the RRG according to the second MRG of the mapped cluster, however neither the first data protection set, nor the second, can be stored in part according to the first MRG and in other part according to the second MRG, e.g., the data protection sets can be stored within one of the MRGs but not bridge between MRGs. As another example, a mapped cluster can comprise data storage according to a first and a second MRG, wherein the first MRG can be embodied in a first RRG, wherein the second MRG can be embodied in a second RRG, and wherein a first and a second data protection set can be stored via the mapped cluster. In this other example, the data protection sets can again be constrained from bridging between the MRGs. As is noted elsewhere herein, the compartmentalization of the real storage space via RRGs can be reflected in MRGs by requiring that an MRG be wholly supported within a single RRG, although an RRG can contemporaneously support more than one MRG. Moreover, also as is disclosed elsewhere herein, allocating MRGs can enable similar compartmentalization of mapped clusters, such that the topology of a mapped cluster subject to MRG constraint can be selected, adapted, etc., to provide for reducing a likelihood of a data loss event, intelligently providing for a remotely located redundant data, or other benefits. As an example, a data protection set can be stored in accord with a first MRG enabling localized recovery of data of the data protection set, while a replica of the data protection set can be stored remotely according to a second MRG such that, where the first MRG becoming less accessible, can be compensated for via enabling access to data via the remote replica of the second MRG.

Accordingly, method 700 can comprise facilitating data storage, at 730, wherein the data storage can be directed to the mapped cluster via the real cluster in accord with the MRG. Data of the data protection set can therefore be stored 'within' the MRG of the mapped cluster, e.g., via real storage elements mapping to the MRG. The MRG can, as is stated hereinabove, be constrained to be within one RRG. As such, the RRG can provide compartmentalization that can reduce a likelihood of a data loss event corresponding to more than a threshold count of real store age element failures occurring, e.g., it can be more likely that the threshold count of real failures can occur in a whole real cluster as contrasted to occurring within one of a plurality of RRGs of the real cluster.

Storing the data protection set according to the MRG can provide an additional level of compartmentalization to the RRG compartmentalization, e.g., via the logical mapping of mapped storage elements, according to an MRG, to real storage elements of an RRG. As an example, where an RRG supports two equivalent MRGs, then the likelihood of an MRG failure can be one half of the likelihood of the RRG failure probability, e.g., failure of elements in a first half of the RRG may not cause the RRG to fail but can cause the first MRG to fail, failure of elements in a second half of the RRG can similarly not cause the RRG to fail but can cause the second MRG to fail, and failure of the whole RRG can result in the failure of both the first and second MRGs. As another example, where an RRG supports 100 equivalent MRGs, then the likelihood of one MRG failure can be $1/100$th the likelihood of the RRG failure probability. As a further example, where an MRG uses a whole RRG, then the MRG and the RRG can have a same likelihood of failure, e.g., if the RRG fails, then the MRG will also always fail.

The use of an RRG can provide a lower likelihood of a data loss event in comparison to a non-compartmentalized real cluster storage system, wherein the reduced likelihood from the use of RRGs can be further compounded by use of MRGs. Moreover, additional protection against data loss events can be implemented by replication of data protection sets in remotely located MRGs such that where a first MRG becomes less accessible locally, the data can be accessed via a remote copy of the data, e.g., via a remotely located MRG. In an aspect, a first example mapped cluster can store data via a real cluster in accord with one or more MRGs constrained by one or more RRGs. This first example mapped cluster can be replicated remotely via a second example mapped cluster. In an aspect, the first and second example mapped clusters can mirror the MRG topology or can have different MRG topology. As a first example, the first and second example mapped clusters can each employ five MRGs. As a second example, the first example mapped cluster can employ five MRGs while the second mapped cluster can employ one MRG, three MRGs, nine MRGs, or nearly any other number of MRGs, to store a replica of the data protection sets stored via the first example mapped cluster, e.g., the mapped compartmentalization of the second example mapped cluster can be the same or different from the mapped compartmentalization of the first example mapped cluster. Moreover, the real compartmentalization, e.g., the size/topology of the RRGs supporting the MRGs of the first and/or second example mapped clusters, provided via a plurality of RRGs can be the same or different, for example, some RRGs of a real cluster can be of a different size than other RRGs of the real cluster.

FIG. 8 is an illustration of an example method 800, which can enable storage of data according to a mapped redundant array of independent nodes in accord with adapting a count of mapped reliability group constraints, e.g., a change in a count of MRGs, in accordance with aspects of the subject disclosure. At 810, method 800, can comprise determining a topology of a real cluster comprising RRGs, wherein a first portion of the RRGs have a first network proximity, and wherein a second network proximity between the first portion and a second portion of the RRGs is less proximate than the first network proximity. As an example, some RRGs can have less network distance between them than other RRGs, such as in FIG. 3, RRGs 370-372 can communicate across CF 394 and be considered as network proximate, while RRGs 373-375 can be considered less network proximate to RRGs 370-372 due to communication needing to traverse CFs 394, 392, and 396. In this example, RRGs 370-372 can have a same or similar level of proximity to each other as RRGs 373-375 have to each other, e.g., communication between any RRG of the group of RRGs 370-372 can traverse just CF 394 and, similarly, communication between any RRG of the group of RRGs 373-375 can traverse just CF 396. However, in this example, the group of RRGs 370-372 can be considered remote, e.g., less network proximate, from the group of RRGs 373-375 due to communications between the groups traversing CFs 394, 392, and 396. The topology and proximities of RRGs, or groups of RRGs, can be considered in creating, deploying, adapting, modifying, deleting, moving, or otherwise constraining MRGs. As an example of the constraining of an MRG based on a RRG topology of a real cluster, an MRG can be sized to not exceed a size of an RRG, such that where a first RRG is smaller than a desired MRG, the MRG can be provisioned via a second RRG that is sufficiently large. In this example, an alternative solution can be to resize the first RRG to be sufficiently large, although this can be accompanied by other considerations, such as effects of the growth on other MRGs supported by the first RRG, changes in failure probability of the first RRG resulting from adapting the size of the first RRG, or other considerations.

In an aspect, as a mapped cluster evolves, for example increasing in size to store more data, method 800, at 820, can comprise adapting a count of first MRGs comprising a first mapped cluster. As is noted elsewhere herein each MRG of the first MRGs can employ only one RRG of the RRGs, e.g., an MRG typically does not exceed the size of a corresponding RRG. Moreover, where each MRG is not larger than the RRG employed by that MRG, the RRG can support more than one MRG. In an aspect, the adapting can be based on the topology of the real cluster, the first network proximity, and the second network proximity. As an example, in system 600, a second MRG can be added to a first mapped cluster, e.g., MC1.MRG2 at RRG 621 can be added to MCI that can already comprise MC1.MRG1 at RRG 670. In this example, adding MRG2 at RRG 671 can reduce computing resource consumption of MC1 by keeping the MRGs proximate, for example, keeping network communications limited to traversing CF 694 to communicate between MC1.MRG1 and MC1.MRG2, in contrast to adding MRG2 at a less proximate RRG, for example RRG 673-1 of system 600-1 where communication between MRG1 and MRG2 can then traverse CF 694, 692, and 696. In some embodiments, for example where an RRG is sufficiently large to support both a first and second MRG, the adapting the count of MRGs can result in an RRG supporting the first MRG also supporting the second MRG, e.g., in system 600, though not illustrated, this can be envisioned as RRG 670 supporting both MC1.MRG1 and MC1.MRG2.

At 830, method 800 can comprise supporting a redundant copy of the first mapped cluster via a second mapped cluster, wherein the second mapped cluster comprises second MRGs, and wherein provisioning real storage elements mapping to the second mapped cluster is based on the topology of the real cluster, the first network proximity, and the second network proximity. Much as RRG topology and MRG proximities can be considered when adding MRGs to a mapped cluster, these storage system characteristics can be considered in providing further data protection, for example, providing a redundant copy of mapped cluster data in a manner that is more remote from the data to be protected, e.g., via MRGs that are less network proximate. In system 600, for example, mapped cluster MC1 can be replicated via replication of MC1.MRG1 and MC1.MRG2 at 610 and 611 in a less network proximate, e.g., RRGs of CF 696 can be more remote from RRGs of CF 694 than RRGs of CF 694 are to other RRGs of CF 694. Accordingly, in the above example, basing replication of data stored by a mapped cluster on the topology of the real cluster, the first network proximity, and the second network proximity, can enable access to the replicated data via CF 696 if access to the data under CF 694 becomes less accessible.

Figure 9:
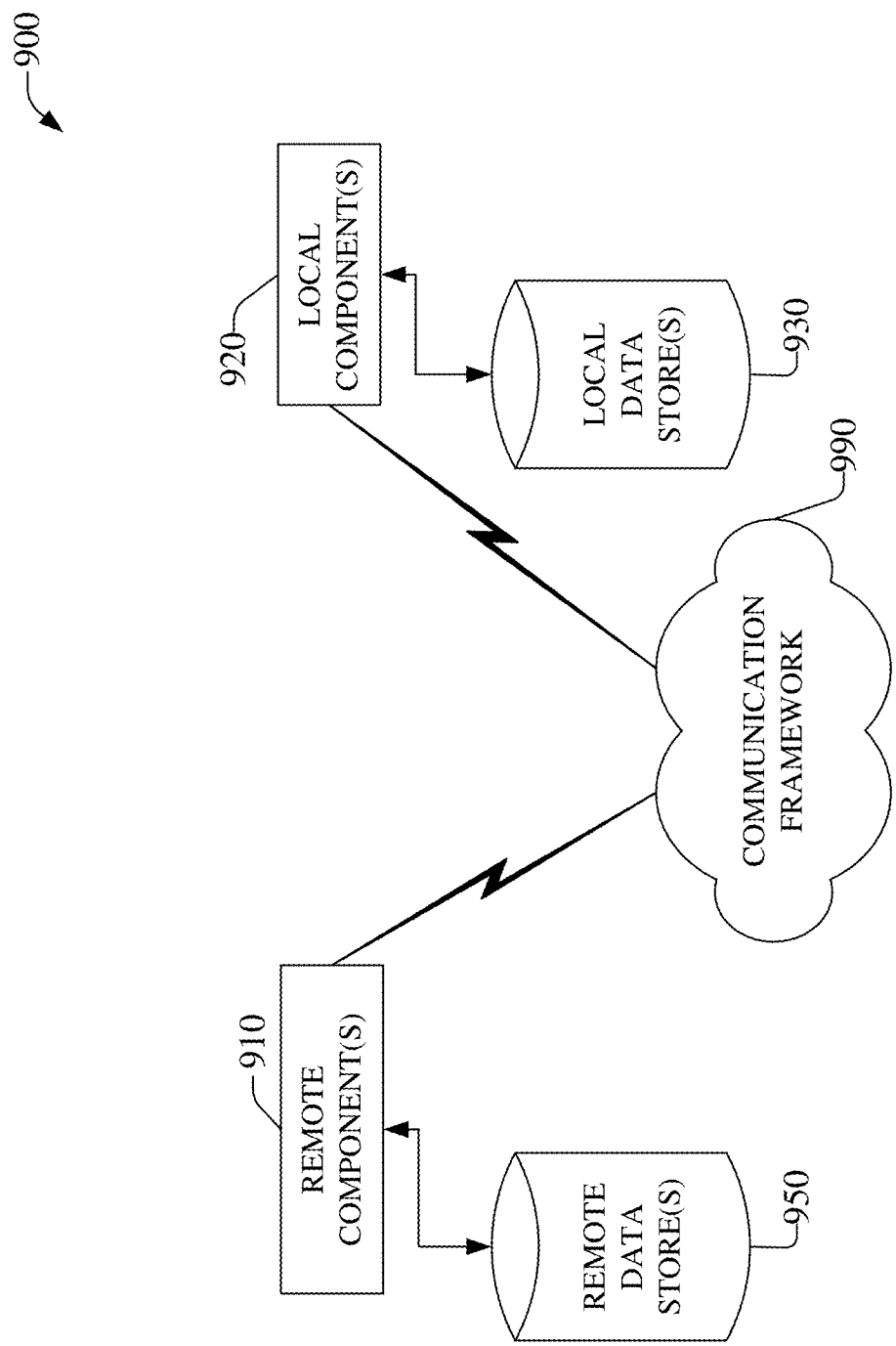
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device embodied in a cluster storage construct 102-302, etc., a remotely located RRG, e.g., RRGs of systems 300, 400, 500-1, 500, 600, 600-1, etc., a remotely located mapped cluster control component, e.g., 220-320, etc., remotely located communication framework components, e.g., comprised in communication framework 392-396, 492-496, 592-1 to 596-1, 592-596, 692-696, 692-1 to 696-1, 990, etc. Communication frameworks, e.g., 392 to 990 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local cluster storage device embodied in a cluster storage construct 102-302, etc., a local RRG, e.g., RRGs of systems 300, 400, 500-1, 500, 600, 600-1, etc., a mapped cluster control component, e.g., 220-320, etc., local communication framework components, e.g., comprised in communication framework 392-396, 492-496, 592-1 to 596-1, 592-596, 692-696, 692-1 to 696-1, 990, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 990. Similarly, local component(s) 920 can be operably connected to one or more local data store(s) 930, that can be employed to store information on the local component(s) 920 side of communication framework 990. As an example, information corresponding to a mapped data storage location can be communicated via communication framework 990 to other devices, e.g., to facilitate access to a real data storage location, as disclosed herein.

Figure 10:
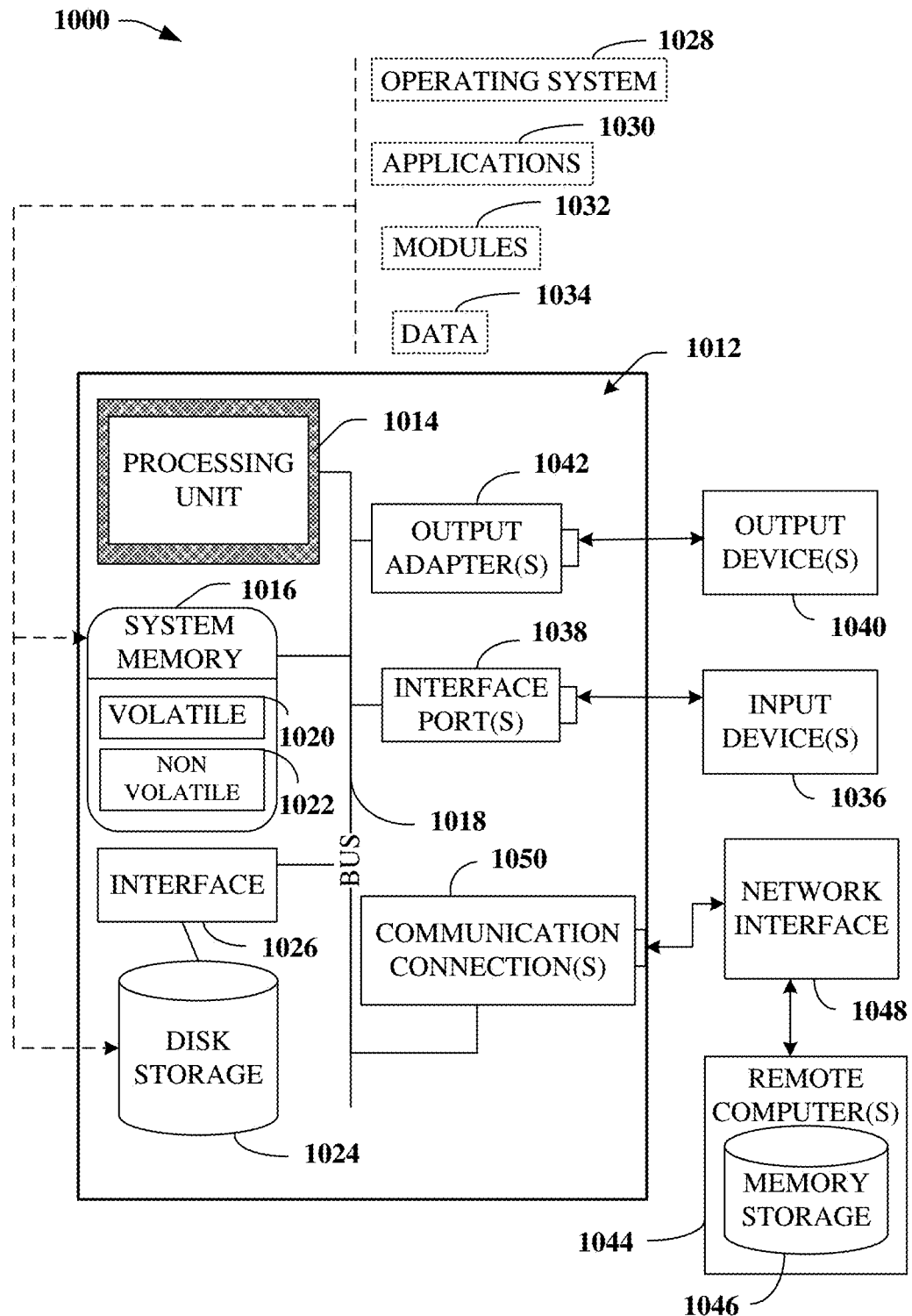
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage device embodied in cluster storage construct 102-302, etc., one or more of RRGs of systems 300, 400, 500-1, 500, 600, 600-1, etc., a mapped cluster control component, e.g., 220-320, etc., communication framework components, e.g., components of communication framework 392-396, 492-496, 592-1 to 596-1, 592-596, 692-696, 692-1 to 696-1, 990, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising assigning a first mapped reliability group (MRG) to a first mapped cluster (MC). The first MRG can be based on a first real reliability group (RRG) of a real cluster storage system supporting the first mapped cluster. The operations can further comprise assigning a second mapped reliability group to a second mapped cluster, which can similarly be based on a second real reliability group of the real cluster storage system. A data protection set can be stored according to the first mapped reliability group and a redundant representation of the data protection set can be stored via the second mapped reliability group.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   in response to determining a real reliability group schema based on a criterion of a real cluster storage system, designating a first real reliability group based on the real reliability group schema;

provisioning a first mapped cluster with a first mapped reliability group based on the first real reliability group; and facilitating a data operation corresponding to a data storage location comprised in the real cluster storage system according to the first mapped reliability group of the first mapped cluster.

2. The system of claim 1, wherein the real cluster storage system comprises 1 to L real storage clusters, and wherein communication between at least two of the 1 to L real storage clusters employ at least one corresponding cluster-level communication framework.

3. The system of claim 2, wherein a real storage cluster of the 1 to L real storage clusters comprises 1 to N real nodes, and wherein communication between at least two of the 1 to N real nodes employ at least one corresponding node-level communication framework.

4. The system of claim 3, wherein a real node of the 1 to N real nodes comprises 1 to M real storage devices, and wherein communication between at least two of the 1 to M real storage devices employ at least one corresponding storage-device-level communication framework.

5. The system of claim 1, wherein the operations further comprise provisioning the first mapped cluster with a second mapped reliability group.

6. The system of claim 5, wherein the provisioning the first mapped cluster with the second mapped reliability group is based on a second real reliability group communicating with the first real reliability group via a node-level communication framework.

7. The system of claim 1, wherein the data operation supports storage of a data protection set according to the first mapped reliability group.

8. The system of claim 1, wherein the operations further comprise provisioning a second mapped cluster with a second mapped reliability group.

9. The system of claim 8, wherein the provisioning the second mapped cluster with the second mapped reliability group is based on a second real reliability group communicating with the first real reliability group via a node-level communication framework and a cluster-level communication framework.

10. The system of claim 9, wherein the second mapped cluster stores a redundant representation of the first mapped cluster.

11. The system of claim 10, wherein the redundant representation of the first mapped cluster replicates a topology of mapped reliability groups employed by the first mapped cluster.

12. The system of claim 10, wherein the redundant representation of the first mapped cluster does not replicate a topology of mapped reliability groups employed by the first mapped cluster.

13. A method, comprising:
designating, by a system comprising a processor and a memory, a first mapped reliability group based on a first real reliability group of a real cluster storage system;
adding, by the system, the first mapped reliability group to a first mapped cluster supported via the real cluster storage system, wherein the first mapped reliability group is not larger than the first real reliability group; and
storing, by the system via the first real reliability group, a data protection set according to the first mapped reliability group of the first mapped cluster.

14. The method of claim 13, wherein the first mapped cluster comprises a second mapped reliability group based on a second real reliability group, and wherein the first and second real reliability groups have a first network proximity that is determined based on a first communication framework.

15. The method of claim 14, wherein the real cluster storage system supports a third mapped reliability group of a second mapped cluster via a third real reliability group, and wherein the first real reliability group and the third real reliability group have a second network proximity.

16. The method of claim 15, wherein, in response to determining that a network distance between the first and third real reliability groups, as indicated by the second network proximity, is greater than between the first and second real reliability groups, as indicated by the first network proximity, storing, by the system, a redundant copy of the data protection set according to the third mapped reliability group.

17. A non-transitory machine-readable medium, comprising executable instructions that, when executed by a processor, facilitate performance of operations, comprising:
assigning, to a first mapped cluster, a first mapped reliability group based on a first real reliability group of a real cluster storage system supporting the first mapped cluster;
assigning, to a second mapped cluster, a second mapped reliability group based on a second real reliability group of the real cluster storage system, wherein the real cluster storage system further supports the second mapped cluster;
storing, via the first real reliability group, a data protection set according to the first mapped reliability group; and
storing, via the second real reliability group and according to the second mapped reliability group, a redundant representation of the data protection set.

18. The non-transitory machine-readable medium of claim 17, wherein the first mapped reliability group is not larger than the first real reliability group, and wherein the first mapped reliability group corresponds only to real storage locations of the first real reliability group.

19. The non-transitory machine-readable medium of claim 17, wherein the operations comprise expanding the first mapped cluster via addition of a third mapped reliability group based on a third real reliability group.

20. The non-transitory machine-readable medium of claim 19, wherein a first network distance between the first and third real reliability groups is a smaller network distance than a second network distance between the first and second real reliability groups.

\* \* \* \* \*